United States Patent [19]

Meurer et al.

[11] 4,257,898
[45] Mar. 24, 1981

[54] METHOD OF PROCESSING WASTE SLUDGE FROM WET PHOSPHORIC ACID PURIFICATION FACILITIES

[75] Inventors: Peter Meurer, Herdecke-Ende; Martin Hater; Fritz Meininghaus, both of Dortmund; Rüdiger Scheel, Schwerte, all of Fed. Rep. of Germany

[73] Assignee: Uhde GmbH, Dortmund, Fed. Rep. of Germany

[21] Appl. No.: 99,530

[22] Filed: Dec. 3, 1979

[30] Foreign Application Priority Data

Dec. 16, 1978 [DE] Fed. Rep. of Germany ....... 2854433

[51] Int. Cl.$^3$ ............................................... C02F 1/00
[52] U.S. Cl. ................................... 210/751; 210/907; 71/25
[58] Field of Search ................... 210/42 R, 47, 51, 59, 210/DIG. 29; 71/2 S

[56] References Cited

U.S. PATENT DOCUMENTS

| | | | |
|---|---|---|---|
| 2,983,594 | 5/1961 | Jost | 71/2 S X |
| 3,135,595 | 6/1964 | Williams | 71/2 S |
| 3,579,321 | 5/1971 | Stoller | 71/2 S |
| 3,763,041 | 10/1973 | Cook et al. | 210/42 R |
| 3,956,119 | 5/1976 | Davidtz | 210/47 |

FOREIGN PATENT DOCUMENTS 51-62557  5/1976  Japan .......................................... 210/51

*Primary Examiner*—Thomas G. Wyse

*Attorney, Agent, or Firm*—Wilson, Fraser, Barker & Clemens

[57] ABSTRACT

The invention relates to a method of processing the waste sludge obtained in purification facilities for phosphoric acid produced by the wet process. The composition of this sludge is such that it cannot be utilized for any purpose in this state. It is known that sludge from wet phosphoric acid purification facilities contains different quantities of certain substances, the concentrations being such that these substances may not be allowed to mix with surface water or ground water under any circumstances, not even in the case of dumps. A typical composition of such waste sludge is as follows:

| | |
|---|---|
| Fe | 9.0% by weight |
| $P_2O_5$ | 21.0% by weight |
| CaO | 6.2% by weight |
| $SiO_2$ | 12.5% by weight |
| MgO | 5.8% by weight |
| $Al_2O_3$ | 2.7% by weight |
| $Cr_2O_3$ | 0.7% by weight |
| $V_2O_5$ | 0.6% by weight |
| $Na_2O$ | 18.0% by weight |
| $K_2O$ | 0.3% by weight |
| F | 1.7% by weight |
| C | 2.5% by weight |
| S | 0.3% by weight |
| Remainder* | 18.7% by weight |
| | 100.0% by weight |

*The remainder consists mainly of hydration water and carbonate that did not decompose at a temperature of 105° C.

6 Claims, No Drawings

METHOD OF PROCESSING WASTE SLUDGE FROM WET PHOSPHORIC ACID PURIFICATION FACILITIES

BACKGROUND OF THE INVENTION

The dumping of this sludge presents considerable problems. For instance, the readily water-soluble alkali-bound phosphates are washed out by rain and this will ultimately result in heavy eutrophication of the local surface water. At the same time, certain portions of the other sludge constituents are also washed out. In a wet phosphoric acid purification unit with an annular throughput of approximately 100,000 tons $H_3PO_4$, the quantity of sludge obtained per year will be about 50,000 tons. According to the present state of engineering technology, there is no alternative but to dump this sludge. The cost of such a temporary dump is mainly determined by the land required, plastic film covering and/or lining and by the inspection requirements to ensure that the ground water is not polluted. A final solution to the problem cannot be foreseen at present.

The aim of the invention is to utilize the waste sludge from wet phosphoric acid purification facilities without causing any problems. This aim is achieved by adding the waste sludge to the steelworks slag in controlled quantities, such that the $P_2O_5$ content of the mixture amounts to 3 to 9%.

SUMMARY OF THE INVENTION

In an embodiment of the invention, the waste sludge is added to the warm prepared slag at a uniform rate.

In a further embodiment of the invention, the waste sludge is distributed uniformly over a hot slag bed.

The advantages attained by the invention consist primarily of the fact that a waste product from a wet phosphoric acid purification unit, said product containing a relatively high proportion of readily water-soluble and citrate-soluble $P_2O_5$ as well as a relatively high proportion of compounds that would constitute unpermissible environmental pollution in that concentration, is converted by simple means to a product that is ultimately deposited on and enters the soil over a large area. The other waste sludge substances thus distributed do not constitute an unpermissible pollution of the soil, since they are present in this type of fertilizer in a much lower concentration than in high-percentage phosphatic fertilizers, such as superphosphate and mixed fertilizers. The commonly known reason for this is that, when manufacturing high-percentage phosphatic fertilizers directly from phosphate rock or from unpurified wet phosphoric acid, the natural impurities are simultaneously introduced into the product.

Apart from the advantages mentioned above, the process according to the invention simultaneously permits the $P_2O_5$ of the steelworks slag to be increased, because the content of citric-acid-soluble $P_2O_5$ in the sludge is considerably higher than in the slag. Even in the case of steelworks slag from modern converters that use oxygen blasting where the $P_2O_5$ content of the slag has dropped to about 1%, a reconcentration to about 3-9% $P_2O_5$ by admixing waste sludge will only increase the content of residual substances to a level that is far below the permissible limits. The use of waste sludge from wet phosphoric acid purification facilities represents a raw material source while obviating the necessity to use expensive phosphate rock.

The uniform distribution of the watery waste sludge over the hot steelworks slag constitutes a particular advantage, because this causes the residual water in the waste sludge to evaporate and the resulting mixture is thus almost dry. Expensive drying facilities are obviated to a large extent and considerable drying energy can be saved.

DESCRIPTION OF THE PREFERRED EMBODIMENT

The following numerical examples serve to describe the process according to the invention in more detail.

EXAMPLE 1

Approximately 250 tons of waste sludge are spread over an uncooled slag bed of about 300 $m^2$ in area and containing around 1000 tons of LD steelworks slag (LD = Linz-Donawitz process). The LD slag contains 1.2% $P_2O_5$ (soluble), while the sludge contains 21% $P_2O_5$ (soluble) in the dry substance and 50% moisture. By virtue of the bed drying process and the subsequent turning over of the mixture, 10% of the moisture is expelled. The mixture is ground in a heater mill to a dry end product with a grain size of smaller than 0.315 mm and containing 3.4% $P_2O_5$ (soluble).

EXAMPLE 2

Approximately 1400 tons of LD slag and 600 tons of waste sludge are mixed in a mixing bed prior to grinding. The LD slag has already been enriched to 3.5% $P_2O_5$ (soluble) by admixing $P_2O_5$ bearing slag. The waste sludge contains 25% $P_2O_5$ in the dry substance and its moisture content has been reduced to 3.5% in a pre-drying step. After processing the mixture in a combined grinding and drying unit, the product obtained is a lime-based fertilizer containing 8.2% $P_2O_5$ (soluble).

From the above examples it can be seen that while the $P_2O_5$ content of the steelworks slag is increased, the other substances contained in the sludge are diluted. Whereas the dumping of about 50,000 t.p.a. sludge requires an area of 5000 $m^2$, i.e. the amount of sludge per $m^2$ is 10 tons or 10,000 kg, which fact results in an unpermissibly high pollution per $m^3$ surface and ground water, the spreading of 25 kg/100 $m^2$ or 0.25 kg/$m^2$ fertilizer will produce extremely low water pollution. This means that, if the volume of the waste sludge is increased three-fold by adding steelworks sludge, the annual output of about 50,000 tons of waste sludge is distributed over an area of approximately 600 $km^2$.

We claim:

1. A method of converting a waste sludge of substantially no utility from wet phosphoric acid purification, having a relatively high, water-soluble phosphatic content and containing other environmental-polluting components, to a useful fertilizer, said method comprising contacting said sludge with steelworks slag having a relatively low phosphatic content, forming a fertilizer admixture from said sludge and slag having an averaged phosphatic content depending on the relative proportions of sludge and slag used, and reducing the concentration of said other environmental-polluting components to a non-polluting, permissible value.

2. A method according to claim 1, characterized in that waste sludge is spread fairly uniformly over a hot slag bed.

3. The method of claim 1 in which said admixture from said sludge and slag has a phosphatic content in the range of about 3% to about 9% $P_2O_5$ by weight.

4. The method of claim 1 in which said steelworks slag is warm, and contacting said sludge and slag evaporates the water of said sludge and produces a substantially dry admixture.

5. The method of claim 1 in which said waste sludge has approximately the following composition in weight percent:

| | |
|---|---|
| Fe | 9.0% |
| $P_2O_5$ | 21.0% |
| CaO | 6.2% |
| $SiO_2$ | 12.5% |
| MgO | 5.8% |

-continued

| | |
|---|---|
| $Al_2O_3$ | 2.7% |
| $Cr_2O_3$ | 0.7% |
| $V_2O_5$ | 0.6% |
| $Na_2O$ | 18.0% |
| $K_2O$ | 0.3% |
| F | 1.7% |
| C | 2.5% |
| S | 0.3% |
| Remainder | 18.7% |
| | 100.0% |

6. The method of claim 1 in which said fertilizer admixture is lime-based and its phosphatic content is substantially water-soluble.

* * * * *